United States Patent
Kurtz et al.

(10) Patent No.: US 11,078,389 B2
(45) Date of Patent: Aug. 3, 2021

(54) TWIST SHUT ADHESIVE SEALABLE TRASH LINER

(71) Applicant: SUN CHEMICAL CORPORATION, Parsippany, NJ (US)

(72) Inventors: Paul Kurtz, Carlstadt, NJ (US); Philippe Schottland, Carlstadt, NJ (US); Russell Schwartz, Parsippany, NJ (US); Kohei Nakane, Tokyo (JP)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 17/049,762

(22) PCT Filed: Mar. 31, 2020

(86) PCT No.: PCT/US2020/025964
§ 371 (c)(1),
(2) Date: Oct. 22, 2020

(87) PCT Pub. No.: WO2020/205865
PCT Pub. Date: Oct. 8, 2020

(65) Prior Publication Data
US 2021/0087439 A1 Mar. 25, 2021

Related U.S. Application Data

(60) Provisional application No. 62/827,345, filed on Apr. 1, 2019.

(51) Int. Cl.
*C09J 129/02* (2006.01)
*B65D 33/18* (2006.01)
(Continued)

(52) U.S. Cl.
CPC ............ *C09J 129/02* (2013.01); *B65D 33/18* (2013.01); *C09J 167/02* (2013.01); *C09J 177/00* (2013.01)

(58) Field of Classification Search
CPC ....................................................... C09J 129/02
See application file for complete search history.

(56) References Cited

U.S. PATENT DOCUMENTS

| | | |
|---|---|---|
| 3,330,469 A | 7/1967 | Koncak |
| 4,008,851 A | 2/1977 | Hirsch |
| | (Continued) | |

FOREIGN PATENT DOCUMENTS

| | | |
|---|---|---|
| EP | 0 891 930 A1 | 1/1999 |
| EP | 1 447 347 A1 | 8/2004 |
| | (Continued) | |

OTHER PUBLICATIONS

International Search Report issued in International Application No. PCT/US2020/025964, dated Jul. 23, 2020.
(Continued)

*Primary Examiner* — Daniel H Lee
(74) *Attorney, Agent, or Firm* — Marian E. Fundytus; Ostrolenk Faber LLP.

(57) ABSTRACT

In the present invention, a solvent-based (SB) adhesive for the purpose of closing or sealing the open end of a bag, such as a plastic trash bag, liner or like, is coated to the exterior or interior surface of said bag and creates a neat, tight functional seal to said bag when twist activated.

13 Claims, 8 Drawing Sheets

(51) Int. Cl.
*C09J 167/02* (2006.01)
*C09J 177/00* (2006.01)

(56) References Cited

U.S. PATENT DOCUMENTS

| | | |
|---|---|---|
| 4,785,940 A | 11/1988 | Wilson |
| 4,906,108 A | 3/1990 | Herrington et al. |
| 4,973,171 A | 11/1990 | Bullard |

FOREIGN PATENT DOCUMENTS

| | | | | |
|---|---|---|---|---|
| GB | 1 096 058 A | 12/1967 | | |
| GB | 1096058 A | * 12/1967 | ............. | B65D 65/14 |

OTHER PUBLICATIONS

Written Opinion of the International Searching Authority issued in International Application No. PCT/US2020/025964, dated Jul. 23, 2020.

* cited by examiner

TWIST SHUT ADHESIVE SEALABLE TRASH LINER

CROSS REFERENCE TO RELATED APPLICATIONS

The present application is a 35 U.S.C. § 371 National Phase application based on PCT/US2020/25964, filed 31 Mar. 2020, which claims the benefit of U.S. Provisional Application No. 62/827,345, filed 1 Apr. 2019, the subject matter of each of which is incorporated by reference in their entirety.

FIELD OF THE INVENTION

The present invention relates to a method to securely seal bags, particularly plastic bags such as trash bags, food storage bags, etc.

BACKGROUND

Trash bags* or waste receptacle liners* are well known in the art and conventional bags can be closed by simply twisting the top of the bag and tying a knot. However, relying on knot tying wastes a lot of trash bag storage capacity.

The terms "trash bag", "bag", "trash bag liner", "trash can liner", "receptacle liner", etc. are used interchangeably throughout the present application and it is understood that though the present invention is drawn to trash bags and trash can liners as preferred embodiments, the invention could also apply to any other receptacle or storage vessel or material that would benefit from a twist and seal feature. This could include bags for food storage, food packaging, vegetative materials, industrial materials, medical materials, medical waste, biohazardous materials, pet waste, disposable tablecloths, disposable picnic blankets etc. In a preferred embodiment, the receptacle of the present invention would be a plastic film material.

In an effort to improve trash bag closure, twist ties can be used to secure the closure. However, this makes the bag subject to needing a twist tie available when desiring to close the bag. Towards the end of the roll or box of trash bags provided, consumers often do not have a twist tie available either through loss or having to using multiple ties for a single trash bag to secure its closure.

Alternatively, the top of the bags can be modified to provide multiple tabs which can be used to tie a knot or have a draw string inserted to close the top. However, these redesigns of the top of the bag to make it more suitable for tying or closure greatly adds to the time and expense of manufacturing the trash bag. In addition, twist tie, multiple tabs or draw strings leaves a gap or a non-secure seal in the opening of the bag which allows odors to escape and attracts rodents.

Moreover, the twist tie, multiple tab and/or draw string trash bags are ill-suited to handling heavy loads of trash and/or liquid materials. Filled trash bags are often subjected to significant pressures which can burst open the bag and/or subject to leaks of trash or liquid when the trash bag is turned sideways or upside down during the trip to the landfill.

To affect a more secure closure of the trash bag, use of adhesives has been contemplated. Some representative examples include U.S. Pat. No. 4,008,851 which refers to bag closure using adhesive tape on the outside of the bag to secure closure and U.S. Pat. No. 4,785,940 which refers to a flexible bag having a pressure sensitive adhesive closure strip adhered to the back panel and to the rear surface of the front panel.

As with other types of adhesives used in trash bags to secure closure, there is a need to use a paper release liner strip to cover the adhesive to prevent blocking, but the release strip must be removed before sealing. U.S. Pat. No. 4,906,108 refers to a plastic tape which is coated with adhesive in alternating spots, then folded in corrugations to cover the spots of adhesive. When used, the tape is manually stretched to expose the adhesive, then wrapped around the neck of the bag to effect closure. However, the pressure sensitive adhesive tape is placed on the bag after the construction and would require a different manufacturing process. Furthermore, the tape adds bulk to the final package, increasing the need for valuable shelf space for the bags. Moreover, the adhesive tie could potentially detach from the bag or liner, thereby decreasing future use of the product. Similar to other solutions for securely sealing trash bags, closure failures, such as ties slipping off the trash bag, could result in rips or tears, or otherwise allow the bag to re-open.

U.S. Pat. No. 4,973,171 refers to a plastic bag, such as a trash bag, wherein the closure portion of the bag is a plastic having dead fold properties, such as oriented high-density polyethylene or polystyrene. The bag is closed by twisting the closure portion. However, the polystyrene and polyethylene are co-extruded to form the liner. The polystyrene coextrusion layer provides the dead fold characteristics to the liner and the twistable closure seal. To only use a top coextruded polystyrene layer to seal the bag would be costly and non-sustainable, the co-mingling of recycling streams makes the liner difficult to recycle over time considering that the rest of the liner is tubular polyethylene. Moreover, an adhesive tape holds the two layers (polystyrene and polyethylene) together, and further adding complexity to the manufacturing process. Other problems with these bags include the dead-fold seal was not robust enough to satisfy the application requirements for trash. Dead-fold films are used in confectionary items such as hard candies, where weak seal strengths are acceptable.

A need still exists for more efficient and secure ways of sealing trash bags.

SUMMARY OF THE INVENTION

In the present invention, solvent-based adhesive is applied to a flexible article, which can be formed into a flexible article, such as a trash liner. Preferably, the adhesive resists blocking. The trash liner, when full, can be twisted to form a tight seal.

In a particular aspect, the present invention provides a method for preparing a twist and seal flexible article, comprising:
 a) providing a flexible article comprising:
  i) a front panel and a back panel, each comprising a flexible substrate;
  ii) wherein the front panel and the back panel each have an inside surface and an outside surface;
  iii) the inside surface of the front panel faces the inside surface of the back panel;
  iv) the front panel and the back panel are joined on three sides, and the fourth side is open;
 b) providing an adhesive composition;
 c) applying the adhesive composition:
  i) to the inside surface of the front panel and the inside surface of the back panel; wherein the article can be sealed by a twisting motion that brings the inside surface of the back panel and the inside surface of the front panel into contact that activates the adhesive composition; or ii) to the outside surface of the front panel and the inside surface of the back panel; wherein the article can be sealed by a twisting motion, or a fold over and twisting motion, that brings the outside surface of the front panel and the inside surface of the back panel into contact that activates the adhesive composition; or iii) to the inside surface of the front panel and the outside surface of the back panel; wherein the article can be sealed by a twisting motion, or a fold over and twisting motion, that brings the inside surface of the front panel and the outside surface; or iv) to the outside surface of the front panel and the outside surface of the back panel; wherein the article is inverted (turned inside out) prior to use so that the article can be sealed with a twisting motion that brings the adhesive coated surfaces of the front panel and the back panel into contact that activates the adhesive composition.

In certain embodiments, the adhesive is applied to 100% of the inside surface of the front panel, and 100% of the inside surface of the back panel, in a continuous coating.

In other embodiments, the adhesive is applied to only a portion of one or both of the inside surface of the front panel and the inside surface of the back panel, in a discontinuous or patterned coating.

In certain embodiments, the flexible article is a trash bag or liner.

In certain embodiments, the present invention provides a flexible article prepared by the method of the present invention.

These and other objects, advantages, and features of the invention will become apparent to those persons skilled in the art upon reading the details of the formulations and methods as more fully described below.

BRIEF DESCRIPTION OF THE DRAWINGS

FIGS. 1A to 7A illustrate a flexible substrate bag, sealed on three sides, with one side open (depicted as the top of the bag). FIGS. 1B to 7B illustrate an enlarged version of the area inside the dashed box on the inner surface of the bag.

FIG. 1: FIG. 1A illustrates a trash bag having an outer surface 1, and an inner surface 2. Adhesive is printed in a continuous strip 3 on the inner surface of the bag. FIG. 1B is an enlargement of the area inside the dashed box in FIG. 1A.

FIG. 2: FIG. 2A illustrates a trash bag having an outer surface 1, and an inner surface 2. Adhesive is printed in a block pattern 4 on the inner surface of the bag. FIG. 2B is an enlargement of the area inside the dashed box in FIG. 2A.

FIG. 3: FIG. 3A illustrates a trash bag having an outer surface 1, and an inner surface 2. Adhesive is printed in a splatter pattern 5 on the inner surface of the bag. FIG. 3B is an enlargement of the area inside the dashed box in FIG. 3A.

FIG. 4: FIG. 4A illustrates a trash bag having an outer surface 1, and an inner surface 2. Adhesive is printed in a block and splatter pattern 6 on the inner surface of the bag. FIG. 4B is an enlargement of the area inside the dashed box in FIG. 4A.

FIG. 5: FIG. 5A illustrates a trash bag having an outer surface 1, and an inner surface 2. Adhesive is printed in a patch pattern 7 on the inner surface of the bag. FIG. 5B is an enlargement of the area inside the dashed box in FIG. 5A.

FIG. 6: FIG. 6A illustrates a trash bag having an outer surface 1, and an inner surface 2. Adhesive is printed in a line pattern 8 on the inner surface of the bag. FIG. 6B is an enlargement of the area inside the dashed box in FIG. 6A.

FIG. 7: FIG. 7A illustrates a trash bag having an outer surface 1, and an inner surface 2. Adhesive is printed in a crosshatch pattern 9 on the inner surface of the bag. FIG. 7B is an enlargement of the area inside the dashed box in FIG. 7A.

FIG. 8A illustrates a filled trash bag, in which outer surface 1 is visible, that has been twisted and is sealed, as shown by twist seal 10. FIG. 8B illustrates the same bag, which has been inverted, and the contents are remaining inside the bag.

DETAILED DESCRIPTION OF THE INVENTION

Figure 1:
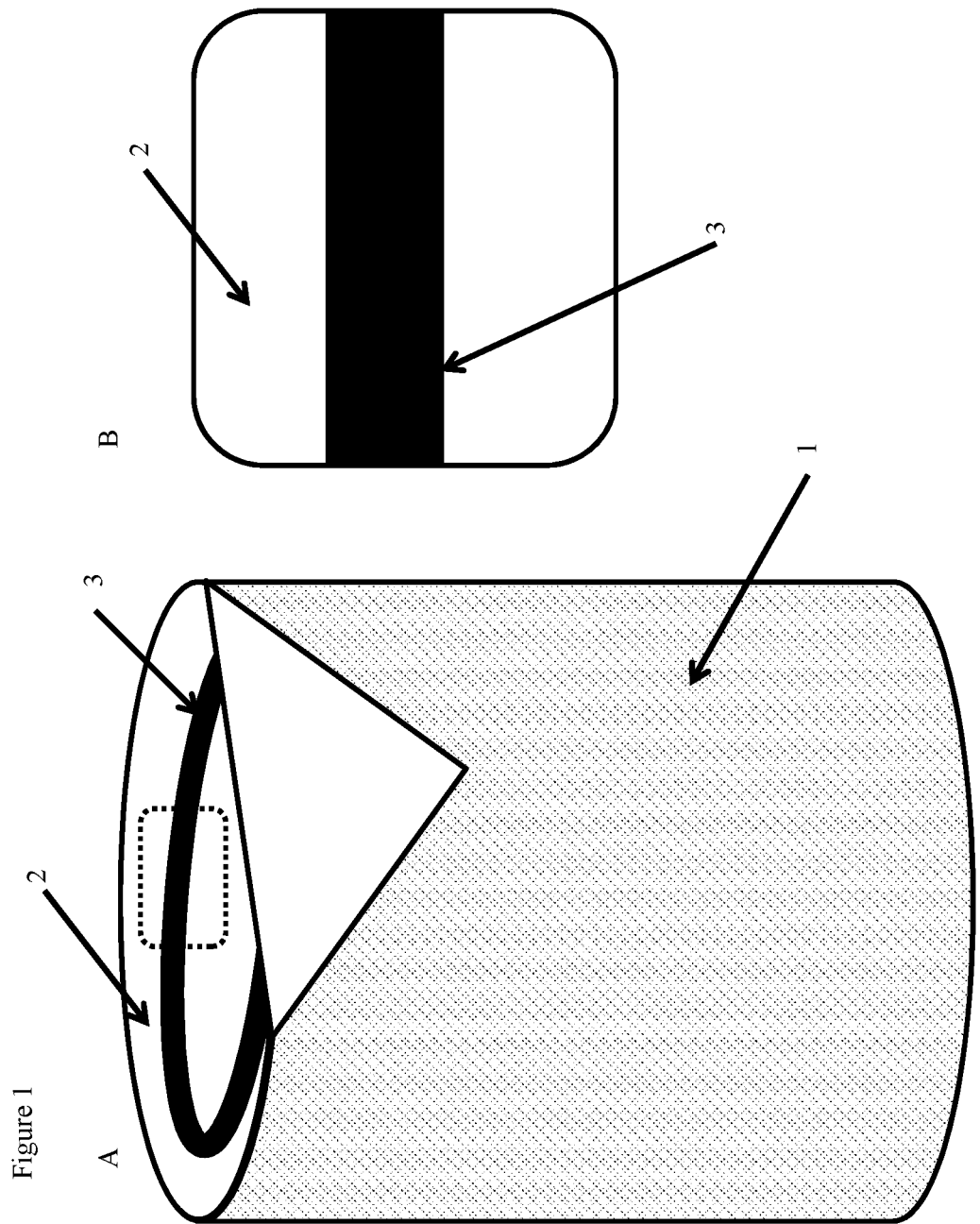
Figure 2:
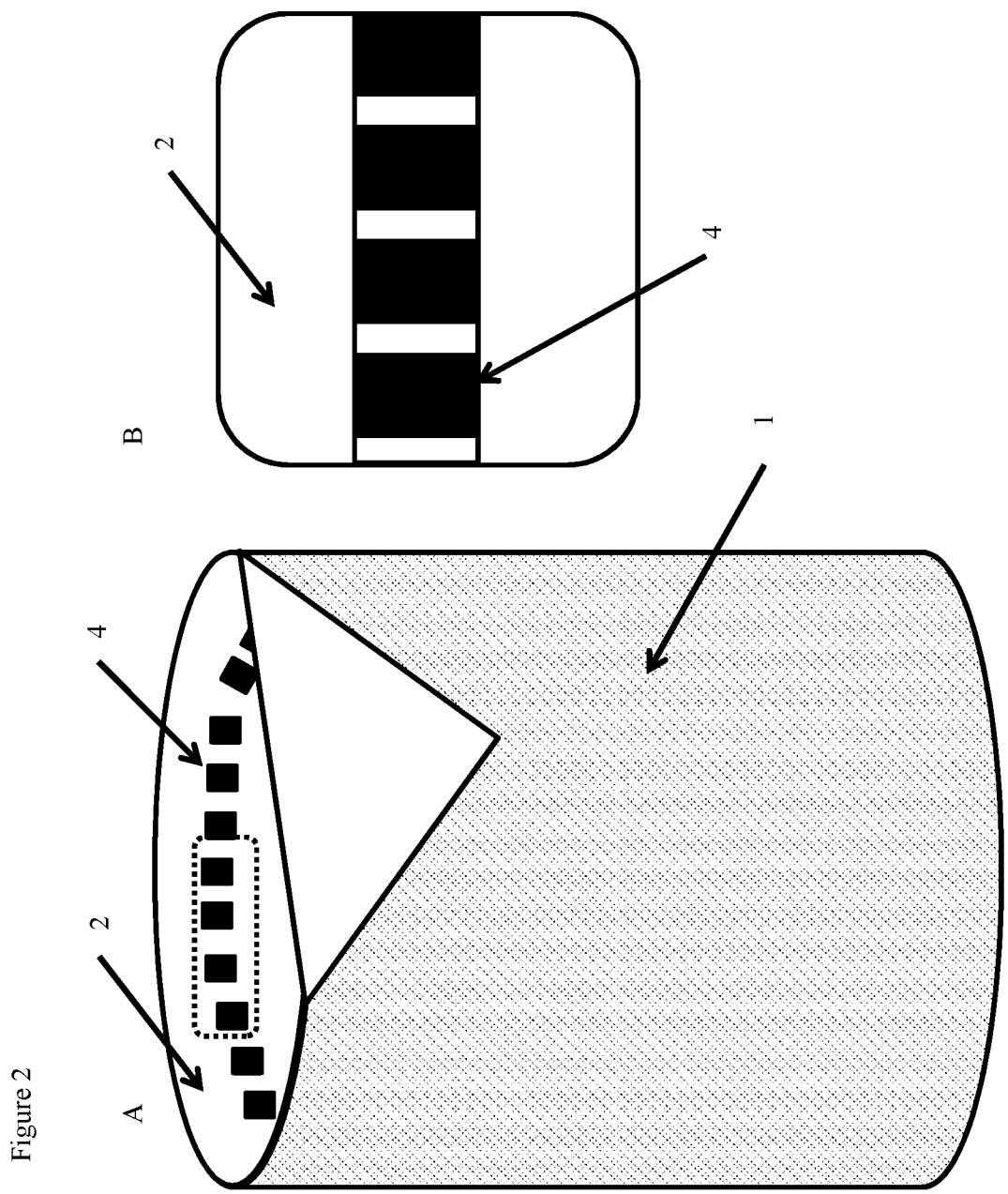
Figure 3:
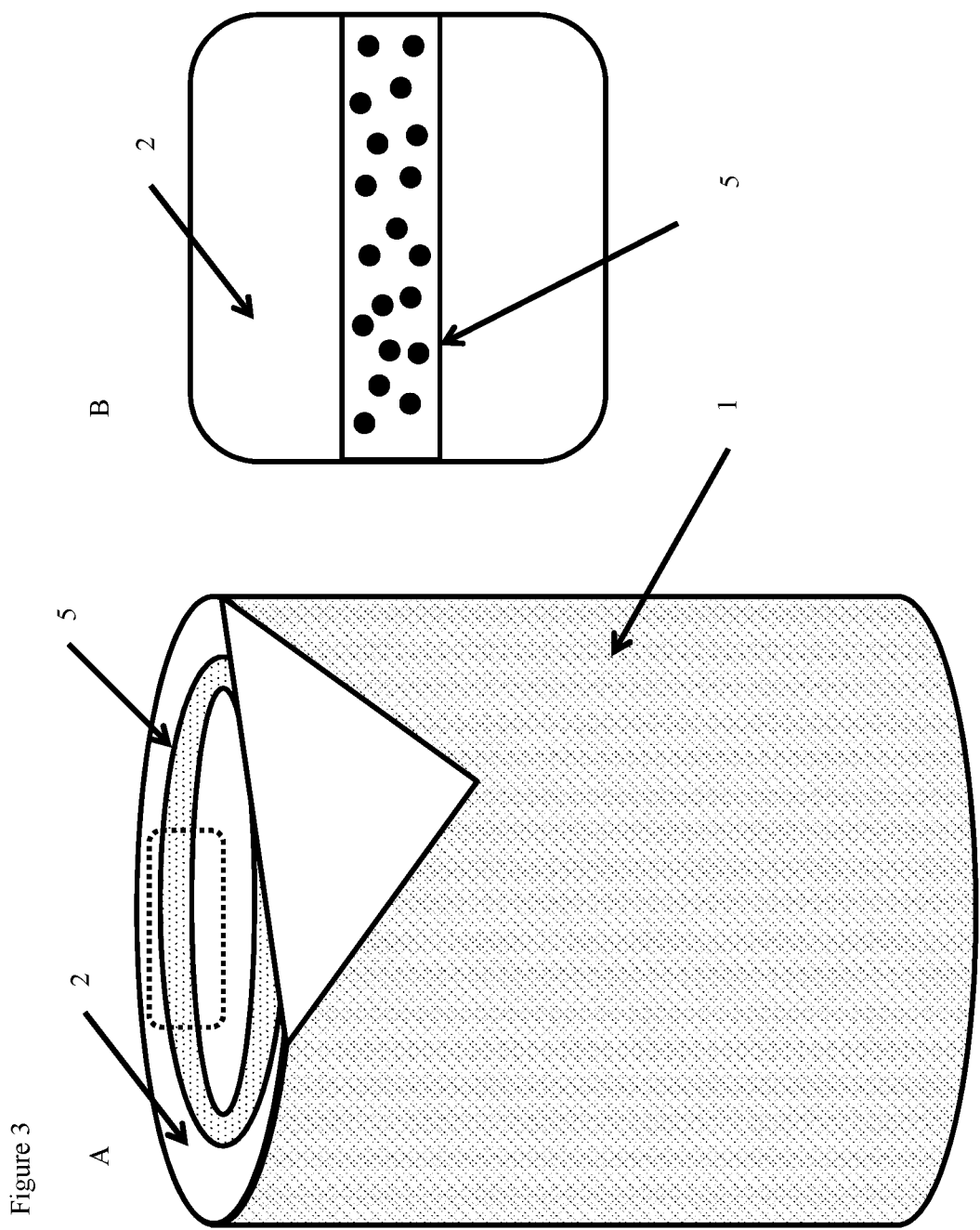
Figure 4:
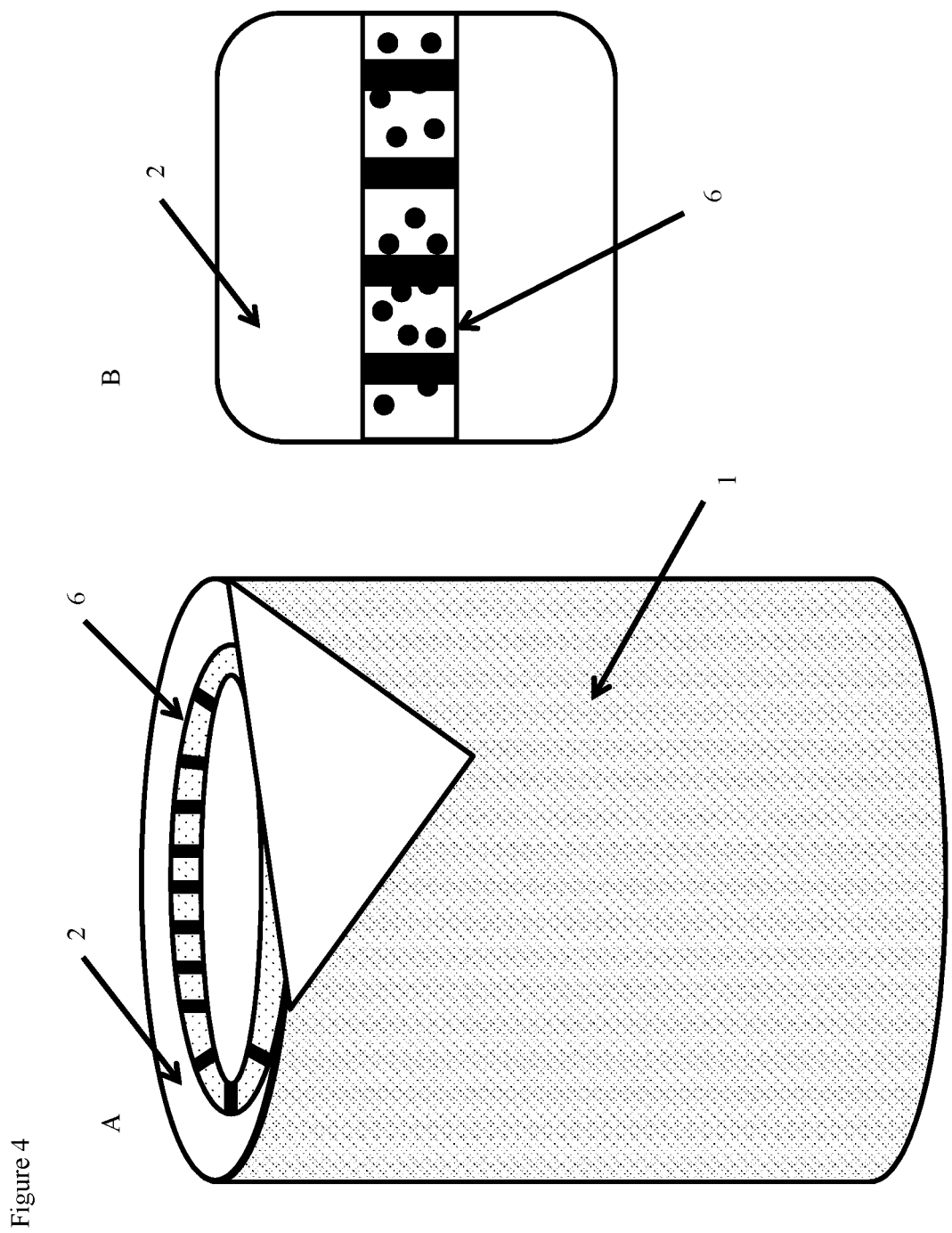
Figure 5:
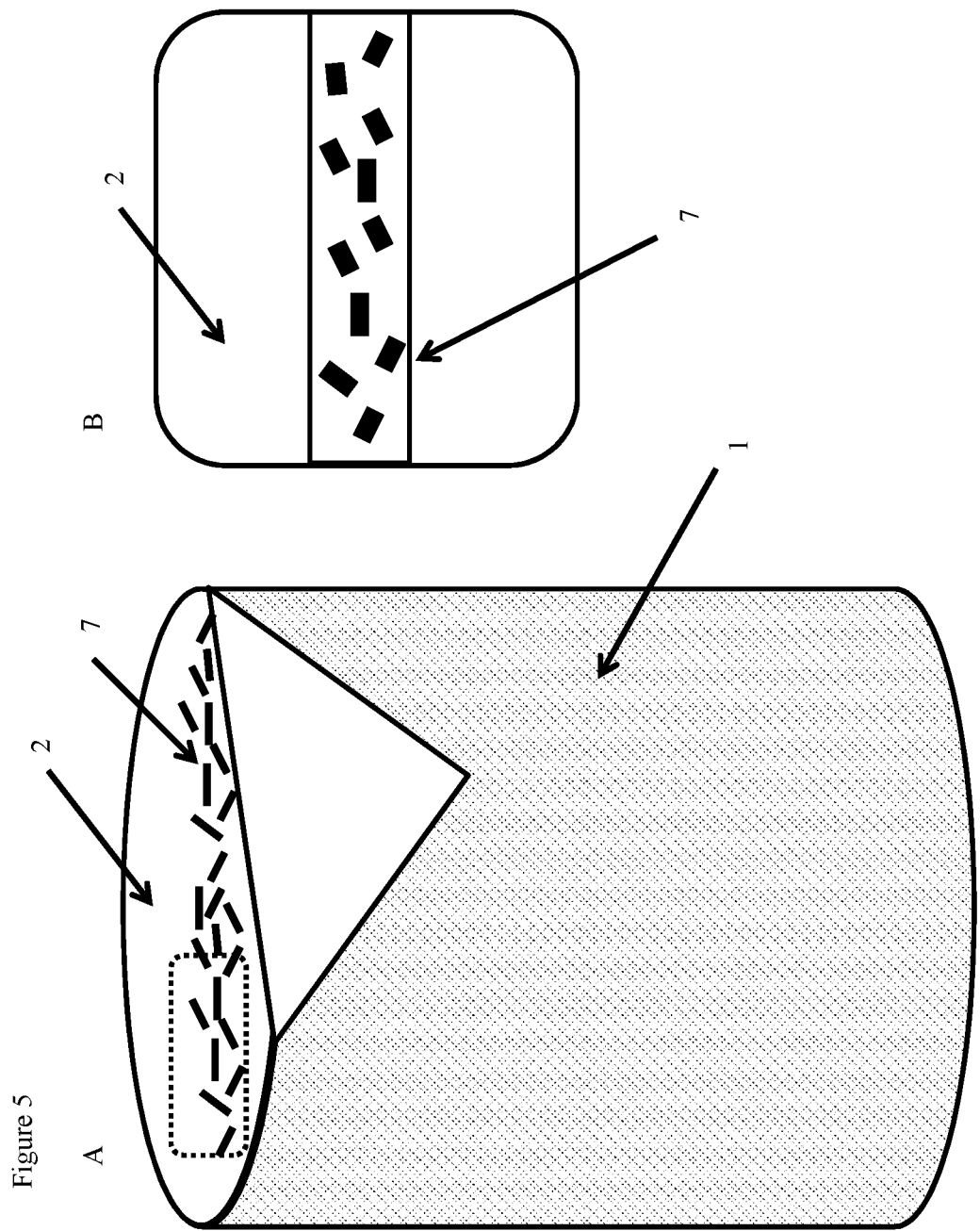
Figure 6:
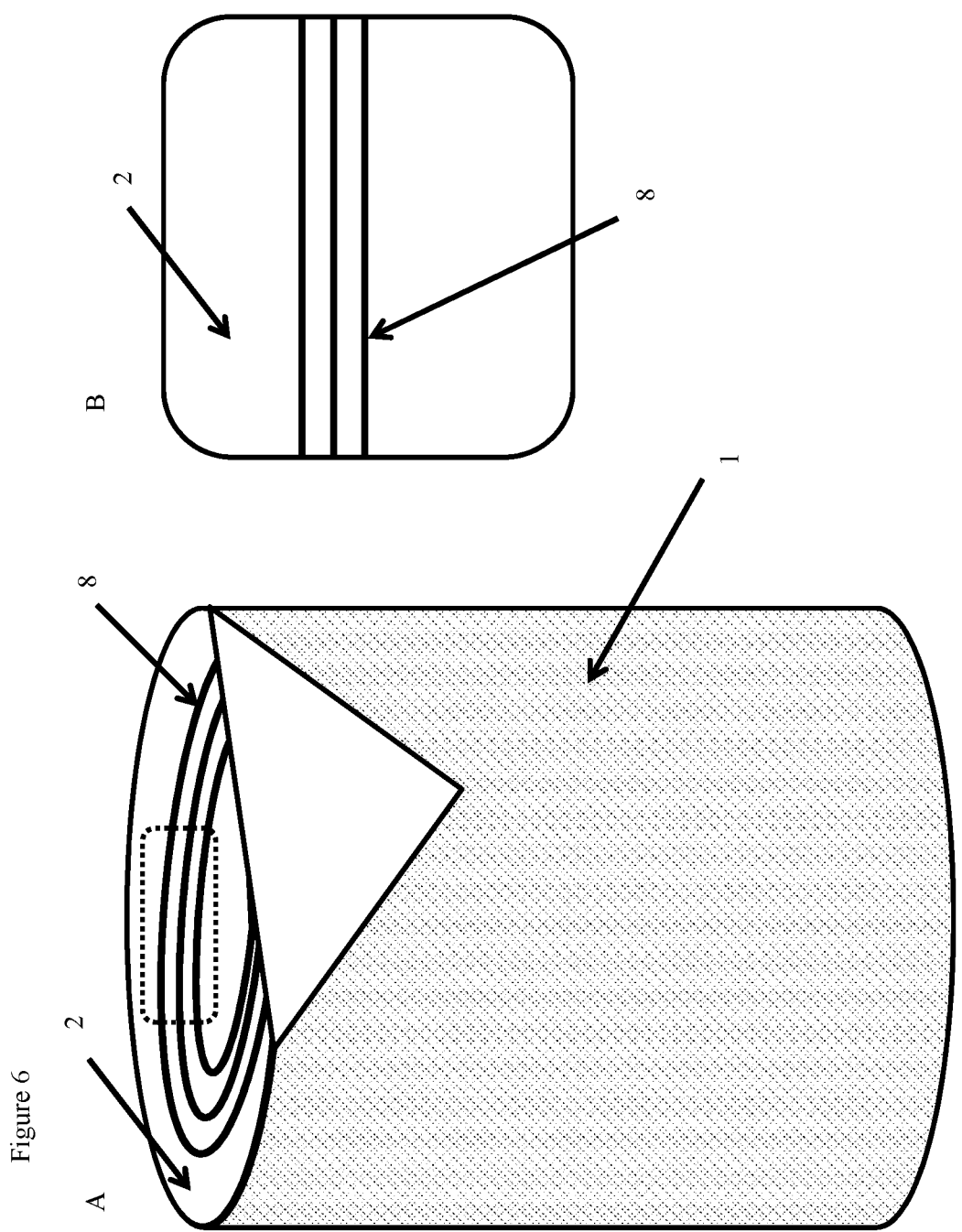
Figure 7:
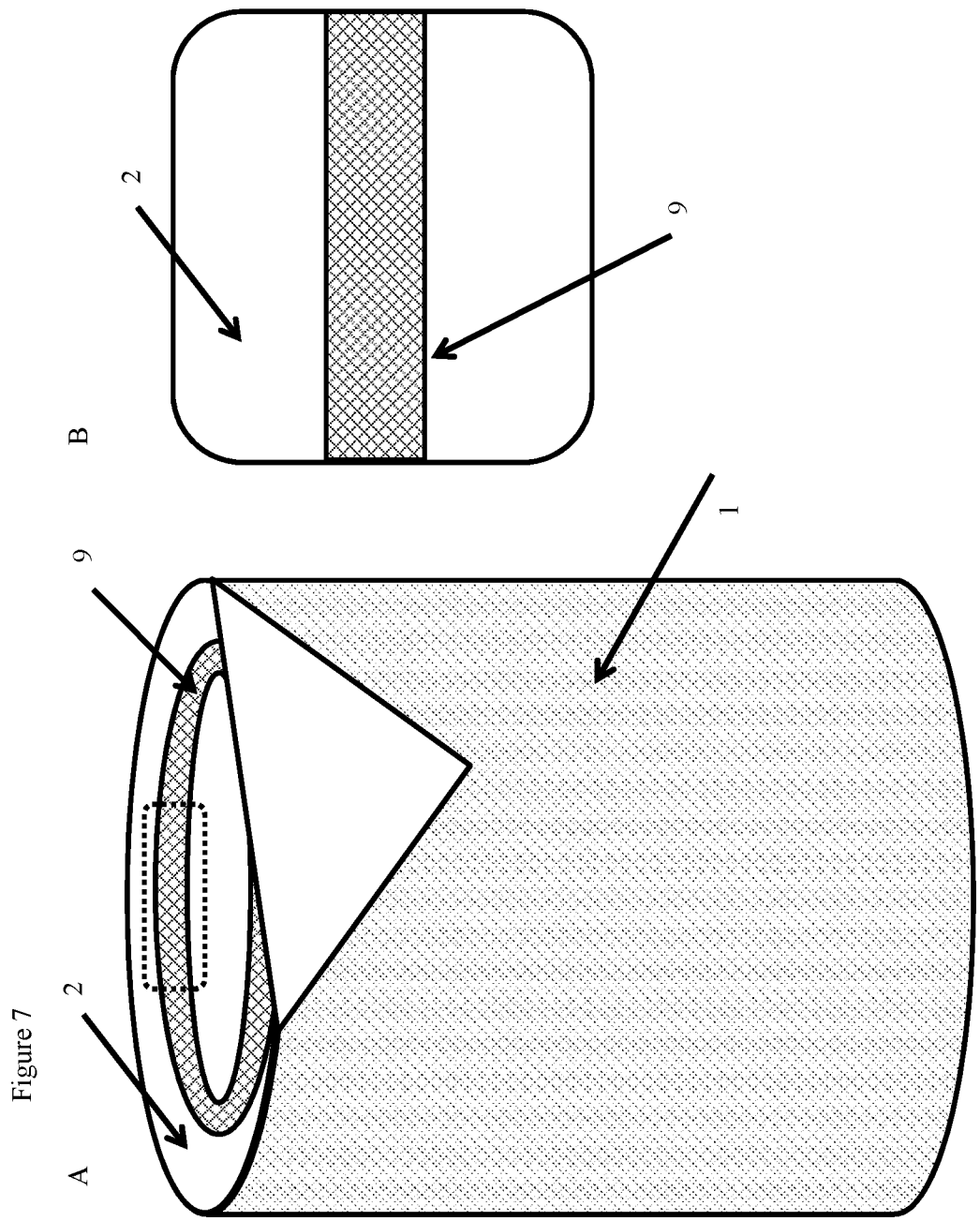
Figure 8:
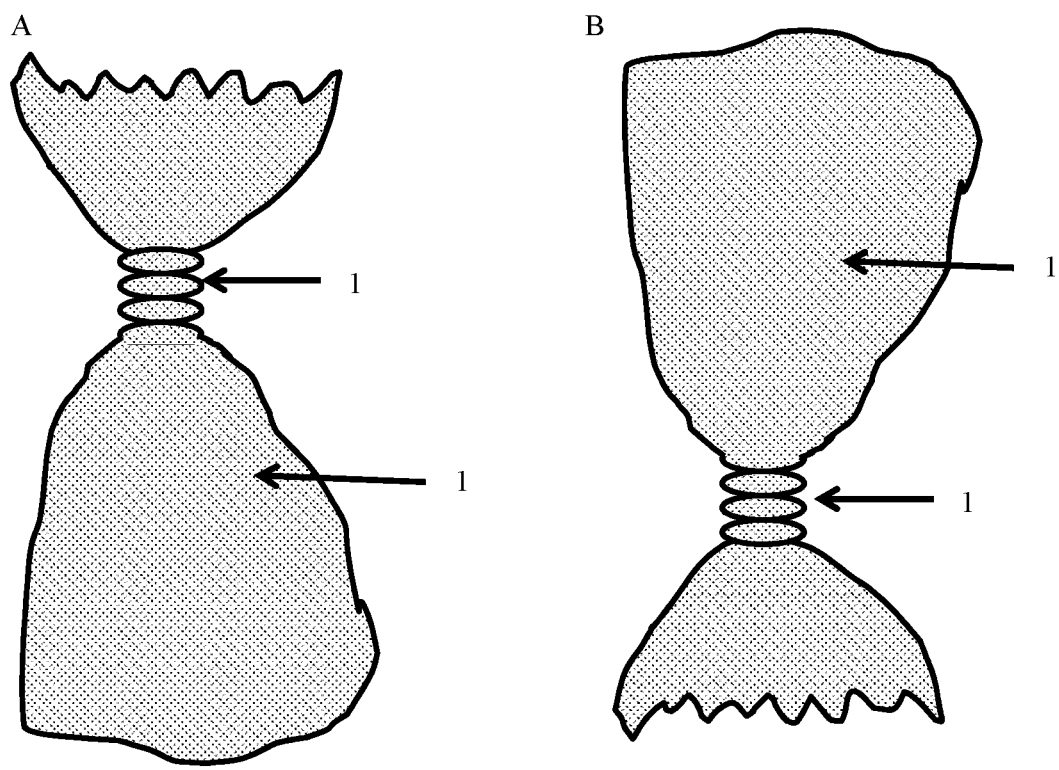
FIG. 8.

It is to be understood that the foregoing general description and the following detailed description are exemplary and explanatory only, and are not restrictive of any subject matter claimed.

Headings are used solely for organizational purposes, and are not intended to limit the invention in any way.

Unless otherwise defined, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety for any purpose. Although any methods and materials similar or equivalent to those described herein can be used in the practice or testing of the present invention, the preferred methods are described.

In the present invention, solvent-based (SB) adhesive is applied to the trash bag by any number of methods. These methods include, but are not limited to, flexographic printing, gravure printing, bar coating, knife coating, or slot die coating. In the present invention, by printing the adhesive in-line, preferably by flexographic or gravure printing, processing speeds are increased, and the complexity of manufacturing the trash liners is reduced.

Definitions

In this application, the use of the singular includes the plural unless specifically stated otherwise. As used herein, the singular forms "a," "an" and "the" are intended to include the plural forms as well, unless the context clearly indicates otherwise.

In this application, the use of "or" means "and/or" unless stated otherwise. Also, when it is clear from the context in which it is used, "and" may be interpreted as "or," such as in a list of alternatives where it is not possible for all to be true or present at once.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

As used herein, ranges and amounts can be expressed as "about" a particular value or range. "About" is intended to also include the exact amount. Hence "about 5 percent"

means "about 5 percent" and also "5 percent." "About" means within typical experimental error for the application or purpose intended.

It is to be understood that wherein a numerical range is recited, it includes the end points, all values within that range, and all narrower ranges within that range, whether specifically recited or not.

Throughout this disclosure, all parts and percentages are by weight (wt % or mass % based on the total weight) and all temperatures are in ° C. unless otherwise indicated.

As used herein, "room temperature" means 15° C. to 30° C.

As used herein, "substrate" means any surface or object to which an ink or coating can be applied. The substrates of the invention are preferably flexible, such as plastic or polymer film or sheet. Suitable substrates include, but are not limited to, plastics/polymers such as polyethylene, polypropylene, polyvinyl chloride, etc.

As used herein, the term "article" or "articles" means a substrate or product of manufacture. Articles of the invention comprise the substrates of the invention as defined above. Articles include, but are not limited to, trash bags or liners.

As used herein, the terms "bag," "trash bag," "trash bag liner," "trash can liner," "waste receptacle liner," "receptacle liner," and the like, are used interchangeably. A liner could be made of any uniform film suitable to produce a trash bag. Such a uniform film may be compostable.

As used herein, a "solvent-based adhesive" is a mixture of ingredients, typically polymers, dissolved in a solvent.

As used herein, the term "blocking" means unwanted adhesion between layers of plastic film. Quantification of the degree of blocking is described, for example, in ASTM D3354. It is desirable that the layers of substrate do not stick together. The property of a coating to not stick to other layers of substrate is "block resistance." In the case of block resistance, it is desirable that the layers can be pulled apart before the substrate tears. Thus, a smaller force necessary to apply before the layers pull apart is desired. In the present invention, it is desirable that the adhesive does not stick to itself prior to the twisting that activates the adhesive to seal the bag.

Sealable Flexible Articles

The adhesive applied to the bag is preferably resistant to blocking at increased temperatures. The adhesive is resistant to blocking up to about 60° C. (140° F.). For example, the adhesive may be resistant to blocking up to 55° C., or up to about 50° C., or up to about 45° C., or up to about 40° C., or up to about 35° C., or up to about 30° C. In certain embodiments, the adhesive resists blocking a 50 psi and 50° C. for at least about 16 hours, and at 600 psi and room temperature for up to 10 hours.

Using the method of the present invention eliminates disadvantages that are observed with other methods of producing sealable flexible articles. In the present invention, dead fold properties are not co-extruded into the upper liner to produce a twistable seal. In the present invention, the adhesive does not require a release liner strip or separate tie. The material does not block and provides a secure seal upon twisting the liner closed. The adhesive can be applied over the existing liners, thereby removing the coextrusion process, to produce the liners with a twisting seal.

In the present invention, the adhesive for the purpose of closing or sealing the open end of a bag, such as a plastic trash bag, liner or the like, is coated to the exterior or interior surface of the bag, and creates a neat, tight functional seal to the bag when the bag is twisted and the adhesive is activated.

The adhesive is applied as a continuous coat, or as discontinuous pattern printed adhesive sections. The closure portion of the bag can be gathered into a closed seal, leaving the rest of the bag to function the same as typical bags. The applied adhesive section is activated by twisting the bag in a clockwise or counterclockwise direction to seal the bag. When the adhesive is printed on the outside of the bag, the bag can be inverted (turned inside out) so the adhesive is on the inside of the liner. In the pattern printed example, a release lacquer can be applied in the non-adhesive areas to further enhance the resistance of the liner to blocking. When the liner has a SB adhesive applied to the surface of the bag either in a continuous or pattern printed adhesive section where the closure portion of the bag is gathered, this leaves the rest of the bag to function the same as currently available bags, and the applied adhesive section is activated by twisting the bag in a clockwise or counterclockwise direction to seal the bag.

The adhesive closable bag of the present invention forms a tight inner seal and minimizes or prevents odors from escaping, reducing the attraction of rodents or other unwanted insects, pests and animal attacks.

Printing the adhesive in an alternating pattern enhances the block resistance because the adhesive coating is designed to only adhere to itself upon a twisting closure motion. The adhesive also resists incidental contact with particulate matter such as dirt and dust from dumping a dustpan, cat litter, powdery foods such as sugar, salt and cinnamon, as well as static materials such as pet hair, producing the same quality twistable seal as a non-exposed bag.

Preferably, the seal strength of the bag accommodates about 2 kg to about 25 kg of refuse in the bag. For example, the seal strength of the bag may accommodate about 2 kg to about 20 kg of refuse; or about 2 kg to about 15 kg; or about 2 kg to about 10 kg; or about 2 kg to about 5 kg.

In certain embodiments, the bond strength of the activated adhesive to the flexible substrate is greater than the force that results in tearing of the flexible substrate, after completing the blocking test. That is the bag will tear before the adhesive pulls apart.

The SB adhesive preferably comprises one or more polymers; one or more tackifying resins; one or more solvents, optionally including water; and optionally one or more waxes. The solvent system can be tailored to meet the specific customer requirements. The waxes prevent gelation or blocking of the adhesive to itself during manufacturing, storage, shipping and prior to the twisting activation of the adhesive. The polymers and tackifying resins provide the sealing strength and adhesion to the liner substrate. An optional dye or pigment can be incorporated into the adhesive to render it easier to see, in order to more visually indicate the fill capacity of the bag.

The resins, solvents, waxes, polymers and other materials that could be used in the adhesive compositions of the present invention are not limited to any specific type. The key being that the materials provide the performance characteristics (e.g. adhesion, adhesive seal strength, anti-blocking properties, etc.) Non-limiting examples of the type of materials that would typically be selected are shown below.

Suitable resins and polymers include, but are not limited to, aliphatic and aromatic polyurethanes, by manufacturers such as Covestro, Bostik, HB Fuller, Henkel, Sun Chemical, DIC, etc.; polyesters by manufacturers such as Bostik, Stepan, and Evonik; polyamides by manufacturers such as Arkema, polyimides by manufacturers such as 3M, Dow and Dupont; ethylene vinyl acetate polymers, preferably where the vinyl acetate monomer content ranges from 10-60% supplied by manufacturers such as Evatane® (Arkema), Elvax® (DOW/DuPont), Escorene® (ExxonMobil); polyacrylates; polystyrenes; polycarbonates, polyolefin and grafted polyolefins containing maleic anhydride, and polylactides. The above used either alone or in combinations. The adhesives of the invention typically comprise about 1 w % to about 50 wt % resins and polymers, based on the total weight of the adhesive composition. For example, the adhesives may comprise about 1 wt % to about 45 wt % resins and polymers, based on the total weight of the adhesive composition; or about 1 wt % to about 40 wt %; or about 1 wt % to about 35 wt %; or about 1 wt % to about 30 wt %; or about 1 wt % to about 25 wt %; or about 1 wt % to about 20 wt %; or about 1 wt % to about 15 wt %; or about 1 wt % or about 10 wt %; or about 1 wt % to about 5 wt %; or about 5 wt % to about 50 wt %; or about 5 wt % to about 45 wt %; or about 5 wt % to about 40 wt %; or about 5 wt % to about 35 wt %; or about 5 wt % to about 30 wt %; or about 5 wt % to about 25 wt %; or about 5 wt % to about 20 wt %; or about 5 wt % to about 15 wt %; or about 5 wt % to about 10 wt %; or about 10 wt % to about 50 wt %; or about 10 wt % to about 45 wt %; or about 10 wt % to about 40 wt %; or about 10 wt % to about 35 wt %; or about 10 wt % to about 30 wt %; or about 10 wt % to about 25 wt %; or about 10 wt % to about 20 wt %; or about 10 wt % to about 15 wt %; or about 15 wt % to about 50 wt %; or about 15 wt % to about 45 wt %; or about 15 wt % to about 40 wt %; or about 15 wt % to about 35 wt %; or about 15 wt % to about 30 wt %; or about 15 wt % to about 25 wt %; or about 15 wt % to about 20 wt %; or about 20 wt % to about 50 wt %; or about 20 wt % to about 45 wt %; or about 20 wt % to about 40 wt %; or about 20 wt % to about 35 wt %; or about 20 wt % to about 30 wt %; or about 20 wt % to about 25 wt %; or about 25 wt % to about 50 wt %; or about 25 wt % to about 45 wt %; or about 25 wt % to about 40 wt %; or about 25 wt % to about 35 wt %; or about 25 wt % to about 30 wt %; or about 30 wt % to about 50 wt %; or about 30 wt % to about 45 wt %; or about 30 wt % to about 40 wt %; or about 30 wt % to about 35 w %; or about 35 wt % to about 50 wt %; or about 35 wt % to about 45 wt %; or about 35 wt % to about 40 wt %; or about 40 wt % to about 50 wt %; or about 40 wt % to about 45 wt %; or about 45 wt % to about 50 wt %.

Suitable solvents may include, but are not limited to, for example aldehydes; ketones; diacetone alcohol; ethylene glycol ethers, diethylene glycol monoethyl ether and ethylene glycol dimethyl or monobutyl ether; alkyl acetate e.g. ethyl or butyl acetate; alkyl caprolactams; and hydrocarbon solvents such as pentane, octane, hexene, etc. The above used either alone or in combinations. The adhesive compositions typically comprise about 20 wt % to about 80 wt % solvents, based on the total weight of the adhesive. For example, the adhesive compositions may contain about 20 wt % to about 75 wt % solvents, based on the total weight of the adhesive; or about 20 wt % to about 70 wt %; or about 20 wt % to about 65 wt %; or about 20 wt % to about 60 wt %; or about 20 wt % to about 55 wt %; or about 20 wt % to about 50 wt %; or about 20 wt % to about 45 wt %; or about 20 wt % to about 40 wt %; or about 20 wt % to about 35 wt %; or about 20 wt % to about 30 wt %; or about 20 wt % to about 25 wt %; or about 25 wt % to about 80 wt %; or about 25 wt % to about 75 wt %; or about 25 wt % to about 70 wt %; or about 25 wt % to about 65 wt %; or about 25 wt % to about 60 wt %; to about 25 wt % to about 55 wt %; or about 25 wt % to about 50 wt %; or about 25 wt % to about 45 wt %; or about 25 wt % to about 40 wt %; or about 25 wt % to about 35 wt %; or about 25 wt % to about 30 wt %; or about 30 wt % to about 80 wt %; or about 30 wt % to about 75 wt %; or about 30 wt % to about 70 wt %; or about 30 wt % to about 65 wt %; or about 30 wt % to about 60 wt %; or about 30 wt % to about 55 wt %; or about 30 wt % to about 50 wt %; or about 30 wt % to about 45 wt %; or about 30 wt % to about 40 wt %; or about 30 wt % to about 35 wt %; or about 35 wt % to about 80 wt %; or about 35 wt % to about 75 wt %; or about 35 wt % to about 70 wt %; or about 35 wt % to about 65 wt %; or about 35 wt % to about 60 wt %; or about 35 wt % to about 55 wt %; or about 35 wt % to about 50 wt %; or about 35 wt % to about 45 wt %; or about 35 wt % to about 40 wt %; or about 40 wt % to about 80 wt %; or about 40 wt % to about 75 wt %; or about 40 wt % to about 70 wt %; or about 40 wt % to about 65 wt %; or about 40 wt % or about 60 wt %; or about 40 wt % to about 55 wt %; or about 40 wt % to about 50 wt %; or about 40 wt % to about 45 wt %; or about 45 wt % to about 80 wt %; or about 45 wt % to about 75 wt %; or about 45 wt % to about 70 wt %; or about 45 wt % to about 65 wt %; or about 45 wt % to about 60 wt %; or about 45 wt % to about 55 wt %; or about 45 wt % to about 50 w %; or about 50 wt % to about 80 wt %; or about 50 wt % to about 75 wt %; or about 50 wt % to about 70 wt %; or about 50 wt % to about 65 wt %; or about 50 wt % to about 60 wt %; or about 50 wt % to about 55 wt %; or about 55 wt % to about 80 wt %; or about 55 wt % to about 75 wt %; or about 55 wt % to about 70 wt %; or about 55 wt % to about 65 wt %; or about 55 wt % to about 60 wt %; or about 60 wt % to about 80 wt %; or about 60 wt % to about 75 wt %; or about 60 wt % to about 70 wt %; or about 60 wt % to about 65 wt %; or about 65 wt % to about 80 wt %; or about 65 wt % to about 75 wt %; or about 65 wt % to about 70 wt %; or about 70 wt % to about 80 w %; or about 70 wt % to about 75 wt %; or about 75 wt % to about 80 wt %.

Suitable tackifying resins may include, but are not limited to, hydrocarbons; terpenes; polyterpenes; phenolics; aromatic; cyclic hydrocarbons; rosin esters, pinenes, styrenated; styrenated terpenes, terpene phenolics; hydrogenated hydrocarbons; etc. The above used either alone or in combinations. The adhesives typically comprise about 1 wt % to about 50 wt % tackifying resins, based on the total weight of the adhesive. For example, the adhesives may contain about 1 wt % to about 45 wt % tackifying resins, based on the total weight of the adhesive; or about 1 wt % to about 40 wt %; or about 1 wt % to about 35 wt %; or about 1 wt % to about 30 wt %; or about 1 wt % to about 25 wt %; or about 1 wt % to about 20 wt %; or about 1 wt % to about 15 wt %; or about 1 wt % or about 10 wt %; or about 1 wt % to about 5 wt %; or about 5 wt % to about 50 wt %; or about 5 wt % to about 45 wt %; or about 5 wt % to about 40 wt %; or about 5 wt % to about 35 wt %; or about 5 wt % to about 30 wt %; or about 5 wt % to about 25 wt %; or about 5 wt % to about 20 wt %; or about 5 wt % to about 15 wt %; or about 5 wt % to about 10 wt %; or about 10 wt % to about 50 wt %; or about 10 wt % to about 45 wt %; or about 10 wt % to about 40 wt %; or about 10 wt % to about 35 wt %; or about 10 wt % to about 30 wt %; or about 10 wt % to about 25 wt %; or about 10 wt % to about 20 wt %; or about 10 wt % to about 15 wt %; or about 15 wt % to about 50 wt %; or about 15 wt % to about 45 wt %; or about 15 wt % to about 40 wt %; or about 15 wt % to about 35 wt %; or about 15 wt % to about 30 wt %; or about 15 wt % to about 25 wt %; or about 15 wt % to about 20 wt %; or about 20 wt % to about 50 wt %; or about 20 wt % to about 45 wt %; or about 20 wt % to about 40 wt %; or about 20 wt % to about 35 wt %; or about 20 wt % to about 30 wt %; or about 20 wt % to about 25 wt %; or about 25 wt % to about 50 wt %; or about 25 wt % to about 45 wt %; or about 25 wt % to about 40 wt %; or about 25 wt % to about 35 wt %; or about 25 wt % to about 30 wt %; or about 30 wt % to about 50 wt %; or about 30 wt % to about 45 wt %; or about 30 wt % to about 40 wt %; or about 30 wt % to about 35 w %; or about 35 wt % to about 50 wt %; or about 35 wt % to about 45 wt %; or about 35 wt % to about 40 wt %; or about 40 wt % to about 50 wt %; or about 40 wt % to about 45 wt %; or about 45 wt % to about 50 wt %.

Suitable waxes include, but are not limited to, animal derived; petroleum; microcrystalline; synthetic; plant derived; maleic anhydride grafted wax; etc. Other examples include amide wax, erucamide wax, polypropylene wax, paraffin wax, polyethylene wax, teflon, carnuba wax and the like. The above used either alone or in combinations. The waxes are typically present in the adhesive compositions an amount of about 1 wt % to about 20 wt %, based on the total weight of the adhesive composition. For example, the waxes may be present in an amount of about 1 wt % to about 15 wt %, based on the total weight of the adhesive composition; or about 1 wt % to about 10 wt %; or about 1 wt % to about 5 wt %; or about 5 wt % to about 20 wt %; or about 5 wt % to about 15 wt %; or about 5 wt % to about 20 wt %; or about 5 wt % to about 15 wt %; or about 5 wt % to about 10 wt %; or about 10 wt % to about 20 wt %; or about 10 wt % to about 15 wt %; or about 15 wt % to about 20 wt %.

As with most adhesive compositions, additives may be incorporated to enhance various properties. A partial list of such additives includes but is not limited to processing aides; rheology modifiers; adhesion promoters, silicones, light stabilizers, de-gassing additives, ammonia, flow promoters, defoamers, antioxidants, stabilizers, surfactants (anionic, nonionic, cationic), dispersants, plasticizers, rheological additives, waxes, silicones, biocides, fungicides; emulsifiers etc. The above used either alone or in combinations. Additives are typically present in the adhesive compositions in an amount of about 0.5 wt % to about 5 wt %, based on the total weight of the adhesive composition. For example, additives may be present in the adhesive compositions in an amount of about 0.5 wt % to about 4.5 wt %, based on the total weight of the adhesive composition; or about 0.5 wt % to about 4 wt %; or about 0.5 wt % to about 3.5 wt % or about 0.5 wt % to about 3 wt %; or about 0.5 wt % to about 2.5 wt %; or about 0.5 wt % to about 2 wt %; or about 0.5 wt % to about 1.5 wt %; or about 0.5 wt % to about 1 wt %; or about 1 wt % to about 5 wt %; or about 1 wt % to about 4.5 wt %; or about 1 wt % to about 4 wt %; or about 1 wt % to about 3.5 wt %; or about 1 wt % to about 3 wt %; or about 1 wt % to about 2.5 wt %; or about 1 wt % or about 2 wt %; or about 1 wt % to about 1.5 wt %; or about 1.5 wt % to about 5 wt %; or about 1.5 wt % to about 4.5 wt %; or about 1.5 wt % to about 4 wt %; or about 1.5 wt % to about 3.5 wt %; or about 1.5 wt % or about 3 wt %; or about 1.5 wt % to about 2.5 wt %; or about 1.5 wt % to about 2 wt %; or about 2 wt % to about 5 wt %; or about 2 wt % to about 4.5 wt %; or about 2 wt % to about 4 wt %; or about 2 wt % to about 3.5 wt %; or about 2 wt % to about 3 wt %; or about 2 wt % to about 2.5 wt %; or about 2.5 wt % to about 5 wt %; or about 2.5 wt % to about 4.5 wt %; or about 2.5 wt % to about 4 wt %; or about 2.5 wt % to about 3.5 wt %; or about 2.5 wt % to about 3 wt %; or about 3 wt % to about 5 wt %; or about 3 wt % to about 4.5 wt %; or about 3 wt % to about 4 wt %; or about 3 wt % to about 3.5 wt %; or about 3.5 wt % to about 5 wt %; or about 3.5 wt % to about 4.5 wt %; or about 3.5 wt % to about 4 wt %; or about 4 wt % to about 5 wt %; or about 4 wt % to about 4.5 wt %; or about 4.5 wt % to about 5 wt %.

The SB adhesives are prepared by heating the polymer(s), tackifying resin(s), and wax(es) to about their softening point, and dissolving in an appropriate solvent blend. A dye or pigment can be added at any stage, typically during the cooling of the material. Once the pigment has been dispersed, the mixture, if heated, is cooled to room temperature.

In one embodiment, the adhesive is SB comprised of one or more EVA resins preferably from 5-20%; one or more tackifying resins preferably from 10-30%; one or more waxes preferably from 1-10%; and solvent blend between preferably from 30-70%.

In one embodiment, the adhesive is SB comprised of one or more polyester resins preferably 1-30%, one or more tackifying resins preferably from 10-30%; one or more waxes preferably from 1-10%; and solvent blend between preferably from 40-70%.

In one embodiment, the adhesive is SB comprised of one or more polyamide resins preferably from 1-30%, one or more tackifying resins preferably from 10-30%; one or more waxes preferably from 1-10%; and solvent blend between preferably from 40-70%.

Coat weight is determined by obtaining representative samples of the coated material that are weighed, and the coating removed. The differential obtained is the coat weight. Coat weight is an indicator of certain functional adhesive characteristics, for example, closure twistable seal, peelability, appearance, etc. The coat weight will vary depending on the liner thickness. A 1-mil PE liner will typically contain less adhesive (approximately 1-3 gsm), and a 3-mil liner typically contains approximately 10-15 gsm of adhesive. Different liners and uses will also determine the requirements, for example, HAZMAT, medical, pet waste, food packaging, disposable tablecloths, disposable picnic blankets, etc.

EXAMPLES

The following examples illustrate specific aspects of the present invention, and are not intended to limit the scope thereof in any respect, and should not be so construed.
Methods
Application of Adhesive The adhesive was coated/printed on the liners/bags using a 20 Mayer rod at 5-10 gsm dry coat weight.
Coat Weight Representative samples of the coated material were weighed. The coating were then removed, and the sample again weighed. The difference in weight is the weight of the coating.
Blocking Test The liner/bag was placed on a hard surface with the coated surface of the front panel and the coated surface of the back panel in contact. A force was applied by a blocking jig. Test conditions were as follows:

(1) 50 psi at 50° C. for 16 hours; or
(2) 600 psi at room temperature for 10 hours.

The force required to pull apart the adhesive coated surfaces was measured according to the methods described in ASTM D903, using an Instron tensiometer. The maximum T-peel bond strength considered acceptable, indicating blocking resistance, was less than or equal to about 0.43 N/15 mm (less than or equal to about 75 gf/inch).
Bond Strength Bond strength was assessed by measuring the force necessary to re-open the bag after sealing. The seal strength was also checked by pulling the trash liner apart after performing the twist and seal motion. If the bag tore (film destruct bonds) before the coated surfaces were reopened, this meant that the adhesive strength of the coating exceeded the strength of the film itself.

The trash liner was filled with about 4 kg (roughly about 10 lbs) to about 9.5 kg (roughly about 20 lbs) of rubbish, liquid, or both. The trash liner was twisted and sealed motion was performed. The sealed bag was inverted. A pass was given if the contents of the bag remained inside the trash liner without unsealing the bag. The invert bag was shaken to ensure that the trash liner did not re-open. A fail was the bag opened during inversion and the contents spilled out of the trash bag Exposure to Particulate Matter To assess the effect of contacting the adhesive with particulate matter prior to sealing the bag, 25 grams of granulated sugar was rubbed into the coating for 30 seconds, the excess sugar was placed in the trash bag and the bag was sealed.

Example 1. Solvent-Based (SB) Adhesive Composition Comprising EVA Resin

A solvent-based adhesive was prepared according to the formulation in Table 1.

TABLE 1

| Ex. 1 SB adhesive formulation | |
|---|---|
| Material | wt % |
| N-propyl Acetate (solvent) | 23 |
| V&MP Naphtha (solvent) (HAPS free) | 44 |
| Evatane ® 18-150 (EVA resin) | 9.85 |
| Elvax ® 40W (EVA resin) | 3.25 |
| Foral ® 105 (tackifying resin) | 18.9 |
| Shamrock S379 (wax) | 1 |
| Total | 100 |

The Example 1 SB adhesive composition was coated with a 20 Mayer rod at 5-10 gsm dry coat weight. The adhesive, when coated to the liner, passed the blocking tests conducted at 50 psi and 50° C. for 16 hours and the room temperature blocking held at 600 psi for 10 hours. The bag was opened using less than 50 gf/inch after completing the blocking test at 600 psi for 10 hours. The adhesive film weight can be varied depending on the thickness of the liner, the thicker the liner the more adhesive required to seal the bag. The thickness of the two different trial liners were 12.7 µm (0.50 mil) and 76.2 µM (3 mil). Both bags were activated when twisted, and produced film destruct bonds upon reopening the bag, indicating that the adhesive bond strength exceeded the strength of the film itself. In a further test, 25 grams of granulated sugar was rubbed into the coating for 30 seconds, the excess sugar was placed in the trash bag and sealed. The bag seal was not affected after the exposure to granulated sugar. Preferably application methods for the coating include but are not limited to flexographic, gravure, bar, knife, bead and slot die.

Example 2. Solvent-Based (SB) Adhesive Composition Comprising EVA Resin

A solvent-based (SB) adhesive was prepared according to the formulation in Table 2.

TABLE 2

| Ex. 2 SB adhesive composition | |
|---|---|
| Material | wt % |
| 35% 2-Ethyl-1-hexanol | 35 |
| 65% Butyl acetate | 65 |
| Orvac T 9304 (EVA resin with maleic anhydride) | 2.0 |
| Evatane 33-400 (EVA resin) | 4.0 |
| Evatane 28-800 (EVA resin) | 6.0 |
| Foralyn ® 110 (tackifying resin) | 18.0 |
| MICROPOWDER 22 MP (wax) | 3 |
| Total | 100 |

The Example 2 SB adhesive composition was coated with a 20 Mayer rod at 5-10 gsm dry coat weight. The adhesive, when coated to the liner, passed the blocking tests conducted at 50 psi and 50° C. for 16 hours and the room temperature blocking held at 600 psi for 10 hours. The bag was opened using less than 50 gf/inch after completing the blocking test at 600 psi for 10 hours. The adhesive film weight can be varied depending on the thickness of the liner, the thicker the liner the more adhesive required to seal the bag. The thickness of the two different trial liners were 12.7 µm (0.50 mil) and 76.2 µM (3 mil). Both bags were activated when twisted, and produced film destruct bonds upon reopening the bag, indicating that the adhesive bond strength exceeded the strength of the film itself. In a further test, 25 grams of granulated sugar was rubbed into the coating for 30 seconds, the excess sugar was placed in the trash bag and sealed. The bag seal was not affected after the exposure to granulated sugar.

Example 3. Solvent-Based (SB) Adhesive Composition Comprising EVA Resin

A solvent-based (SB) adhesive was prepared according to the formulation in Table 3.

TABLE 3

| Ex. 3 SB adhesive composition | |
|---|---|
| Material | % |
| N-propyl Acetate (solvent) | 23 |
| Toluene | 44 |
| Orvac T 9304 (EVA resin with maleic anhydride) | 1.0 |
| Evatane 33-400 (EVA resin) | 4.0 |
| Evatane 28-800 (EVA resin) | 3.0 |
| Foral ® 105 (tackifying resin) | 12.0 |
| Acrowax C (wax) | 3 |
| Total | 100 |

The Example 3 SB adhesive composition was coated with a 20 Mayer rod at 5-10 gsm dry coat weight. The adhesive, when coated to the liner, passed the blocking tests conducted at 50 psi and 50° C. for 16 hours and the room temperature blocking held at 600 psi for 10 hours. The bag was opened using less than 50 gf/inch after completing the blocking test at 600 psi for 10 hours. The adhesive film weight can be varied depending on the thickness of the liner, the thicker the liner the more adhesive required to seal the bag. The thickness of the two different trial liners were 12.7 µm (0.50 mil) and 76.2 µM (3 mil). Both bags were activated when twisted, and produced film destruct bonds upon reopening the bag, indicating that the adhesive bond strength exceeded the strength of the film itself. In a further test, 25 grams of granulated sugar was rubbed into the coating for 30 seconds, the excess sugar was placed in the trash bag and sealed. The bag seal was not affected after the exposure to granulated sugar.

Example 4. Solvent-Based (SB) Adhesive Composition Comprising EVA Resin

A solvent-based (SB) adhesive was prepared according to the formulation in Table 4.

TABLE 4

Ex. 4 SB adhesive composition

| Material | wt % |
|---|---|
| N-propyl Acetate (solvent) | 23 |
| V&MP Naphtha (solvent) (HAPS free) | 44 |
| Evatane ® 18-150 (EVA resin) | 10.85 |
| Evatane 28-800 (EVA resin) | 2.25 |
| Foralyn ® 85 (tackifying resin) | 15.9 |
| Sharmork ® S-Nuba 5021 (wax) | 4 |
| Total | 100 |

The Example 4 SB adhesive composition was coated with a 20 Mayer rod at 5-10 gsm dry coat weight. The adhesive, when coated to the liner, passed the blocking tests conducted at 50 psi and 50° C. for 16 hours and the room temperature blocking held at 600 psi for 10 hours. The bag was opened using less than 50 gf/inch after completing the blocking test at 600 psi for 10 hours. The adhesive film weight can be varied depending on the thickness of the liner, the thicker the liner the more adhesive required to seal the bag. The thickness of the two different trial liners were 12.7 µm (0.50 mil) and 76.2 µM (3 mil). Both bags were activated when twisted, and produced film destruct bonds upon reopening the bag, indicating that the adhesive bond strength exceeded the strength of the film itself. In a further test, 25 grams of granulated sugar was rubbed into the coating for 30 seconds, the excess sugar was placed in the trash bag and sealed. The bag seal was not affected after the exposure to granulated sugar.

Example 5. Solvent-Based (SB) Adhesive Composition Comprising Polyester Resin A solvent-based (SB) adhesive was prepared according to the formulation in Table 5.

TABLE 5

Ex. 5 SB adhesive composition

| Material | wt % |
|---|---|
| MEK (solvent) | 65 |
| Polyester Vitel 3300 | 15 |
| Foralyn ® 110 (tackifying resin) | 17 |
| Shamrock S379H (wax) | 3 |
| Total | 100 |

The Example 5 SB adhesive composition was coated with a 20 Mayer rod at 5-10 gsm dry coat weight. The adhesive, when coated to the liner, passed the blocking tests conducted at 50 psi and 50° C. for 16 hours and the room temperature blocking held at 600 psi for 10 hours. The bag was opened using less than 50 gf/inch after completing the blocking test at 600 psi for 10 hours. The adhesive film weight can be varied depending on the thickness of the liner, the thicker the liner the more adhesive required to seal the bag. The thickness of the two different trial liners were 12.7 µm (0.50 mil) and 76.2 µM (3 mil). Both bags were activated when twisted, and produced film destruct bonds upon reopening the bag, indicating that the adhesive bond strength exceeded the strength of the film itself. In a further test, 25 grams of granulated sugar was rubbed into the coating for 30 seconds, the excess sugar was placed in the trash bag and sealed. The bag seal was not affected after the exposure to granulated sugar.

Example 6. Solvent-Based (SB) Adhesive Composition Comprising Polyamide Resin A solvent-based (SB) adhesive was prepared according to the formulation in Table 6.

TABLE 6

Ex. 6 SB adhesive composition

| Material | wt % |
|---|---|
| N-propyl Acetate (solvent) | 22 |
| V&MP Naphtha (solvent) (HAPS free) | 41 |
| Polyamide (Unirez ® 2291) | 13 |
| Foral 105 (tackifying resin) | 19 |
| Shamrock S379H (wax) | 5 |
| Total | 100 |

The Example 6 SB adhesive composition was coated with a 20 Mayer rod at 5-10 gsm dry coat weight. The adhesive, when coated to the liner, passed the blocking tests conducted at 50 psi and 50° C. for 16 hours and the room temperature blocking held at 600 psi for 10 hours. The bag was opened using less than 50 gf/inch after completing the blocking test at 600 psi for 10 hours. The adhesive film weight can be varied depending on the thickness of the liner, the thicker the liner the more adhesive required to seal the bag. The thickness of the two different trial liners were 12.7 µm (0.50 mil) and 76.2 µM (3 mil). Both bags were activated when twisted, and produced film destruct bonds upon reopening the bag, indicating that the adhesive bond strength exceeded the strength of the film itself. In a further test, 25 grams of granulated sugar was rubbed into the coating for 30 seconds, the excess sugar was placed in the trash bag and sealed. The bag seal was not affected after the exposure to granulated sugar.

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed:

1. A method for preparing a twist and seal flexible article, comprising:
    a) providing a flexible article comprising:
        i) a front panel and a back panel, each comprising a flexible substrate;
        ii) wherein the front panel and the back panel each have an inside surface and an outside surface;
        iii) the inside surface of the front panel faces the inside surface of the back panel;
        iv) the front panel and the back panel are joined on three sides, and the fourth side is open;
    b) providing an adhesive composition;
    c) applying the adhesive composition:

i) to the inside surface of the front panel and the inside surface of the back panel; wherein the article can be sealed by a twisting motion that brings the inside surface of the back panel and the inside surface of the front panel into contact that activates the adhesive composition; or ii) to the outside surface of the front panel and the inside surface of the back panel; wherein the article can be sealed by a twisting motion, or a fold over and twisting motion, that brings the outside surface of the front panel and the inside surface of the back panel into contact that activates the adhesive composition; or iii) to the inside surface of the front panel and the outside surface of the back panel; wherein the article can be sealed by a twisting motion, or a fold over and twisting motion, that brings the inside surface of the front panel and the outside surface; or iv) to the outside surface of the front panel and the outside surface of the back panel; wherein the article is inverted (turned inside out) prior to use so that the article can be sealed with a twisting motion that brings the adhesive coated surfaces of the front panel and the back panel into contact that activates the adhesive composition.

2. The method of claim 1, wherein the flexible article is a liner or a bag.

3. The method of claim 1, wherein the flexible article comprises a plastic or polymeric material.

4. The method of claim 1, wherein the plastic or polymeric material is a plastic or polymeric film or sheet.

5. The method of claim 1, wherein the adhesive is applied in a continuous coat.

6. The method of claim 1, wherein the adhesive is applied as a discontinuous pattern.

7. The method of claim 1, wherein the adhesive composition resists blocking at 50 psi and 50° C. for 16 hours; and/or wherein the adhesive material resists blocking at 600 psi and room temperature (20° C. to 27° C.) for 10 hours.

8. The method of claim 1, wherein the bond strength (in N/15 mm) between the activated adhesive composition on the front panel and the back panel is greater than the force necessary to tear the flexible article (in N/15 mm).

9. The method of claim 1 wherein the adhesive composition comprises:
 a) one or more polymers or resins;
 b) one or more tackifying resins;
 c) one or more solvents; and
 d) one or more waxes.

10. The method of claim 1, wherein the adhesive comprises one or more ethylene vinyl alcohol (EVA) polymers or resins; and/or one or more polyester polymers or resins; and/or one or more polyamide polymers or resins.

11. The method of claim 1, wherein the adhesive composition is solvent-based.

12. A twist and seal article prepared by the method of claim 1.

13. The twist and seal article of claim 12, wherein the twist and seal article is a bag or liner.

* * * * *